US009717982B2

United States Patent
Quinn et al.

(10) Patent No.: US 9,717,982 B2
(45) Date of Patent: Aug. 1, 2017

(54) CLIENT RENDERING OF LATENCY SENSITIVE GAME FEATURES

(71) Applicant: Microsoft Corporation, Redmond, WA (US)

(72) Inventors: David James Quinn, Seattle, WA (US); Emad Barsoum, Sammamish, WA (US); Charles Claudius Marais, Duvall, WA (US); John Raymond Justice, Bellevue, WA (US); Krassimir Emilov Karamfilov, Seattle, WA (US); Roderick Michael Toll, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/723,498

(22) Filed: Dec. 21, 2012

(65) Prior Publication Data

US 2014/0179421 A1    Jun. 26, 2014

(51) Int. Cl.
*A63F 13/30*    (2014.01)
*A63F 13/00*    (2014.01)

(52) U.S. Cl.
CPC .............. *A63F 13/00* (2013.01); *A63F 13/12* (2013.01); *A63F 2300/1087* (2013.01);
(Continued)

(58) Field of Classification Search
CPC ..................................................... G07F 17/322
(Continued)

(56) References Cited

U.S. PATENT DOCUMENTS 5,838,909 A    11/1998   Roy et al.
6,038,599 A    3/2000   Black et al.
(Continued)

FOREIGN PATENT DOCUMENTS

EP    1640047 A1    3/2006
EP    1779909 A2    5/2007
(Continued)

OTHER PUBLICATIONS

Raghuraman et al "Immersive Multiplayer Tennis With Microsoft Kinect and Body Sensor Network" Published Oct. 29-Nov. 2, 2012.*

(Continued)

*Primary Examiner* — David L Lewis
*Assistant Examiner* — Ross Williams
(74) *Attorney, Agent, or Firm* — Shook, Hardy & Bacon, LLP

(57) ABSTRACT

Embodiments of the present invention split game processing and rendering between a client and a game server. A rendered video game image is received from a game server and combined with a rendered image generated by the game client to form a single video game image that is presented to a user. Game play may be controlled using a rich sensory input, such as three-dimensional image data and audio data. The three-dimensional image data describes the shape, size and orientation of objects present in a play space. The rich sensory input is communicated to a game server, potentially with some preprocessing, and is also consumed locally on the client, at least in part. In one embodiment, latency sensitive features are the only features processed on the client and rendered on the client.

20 Claims, 9 Drawing Sheets

(52) U.S. Cl.
CPC ... *A63F 2300/534* (2013.01); *A63F 2300/538* (2013.01); *A63F 2300/69* (2013.01)

(58) Field of Classification Search
USPC .............................................. 463/36, 40–42
See application file for complete search history.

(56) References Cited

U.S. PATENT DOCUMENTS

| | | |
|---|---|---|
| 6,377,257 B1 | 4/2002 | Borrel et al. |
| 6,415,317 B1 | 7/2002 | Yelon et al. |
| 6,884,172 B1 | 4/2005 | Lloyd et al. |
| 7,587,520 B1 | 9/2009 | Kent et al. |
| 7,603,406 B2 | 10/2009 | Gulliver et al. |
| 7,887,416 B2 | 2/2011 | Katsume et al. |
| 7,889,669 B2 | 2/2011 | Abigail |
| 7,971,157 B2 | 6/2011 | Markovic et al. |
| 8,038,535 B2 | 10/2011 | Jensen |
| 8,092,307 B2 | 1/2012 | Kelly |
| 8,151,199 B2* | 4/2012 | Gerson et al. ............... 715/757 |
| 8,176,437 B1 | 5/2012 | Taubman |
| 8,264,493 B2 | 9/2012 | Peterfreund |
| 8,668,582 B1* | 3/2014 | Overton ........................ 463/31 |
| 8,888,592 B1 | 11/2014 | Pereira et al. |
| 8,968,087 B1 | 3/2015 | Gault et al. |
| 2002/0142843 A1 | 10/2002 | Roelofs |
| 2004/0003039 A1 | 1/2004 | Humphrey |
| 2004/0030882 A1 | 2/2004 | Forman |
| 2004/0082388 A1 | 4/2004 | Simsek et al. |
| 2004/0135805 A1 | 7/2004 | Gottsacker et al. |
| 2004/0193813 A1 | 9/2004 | Nguyen et al. |
| 2006/0135258 A1 | 6/2006 | Maheshwari et al. |
| 2006/0281511 A1 | 12/2006 | Holm et al. |
| 2007/0173325 A1 | 7/2007 | Shaw et al. |
| 2007/0195097 A1 | 8/2007 | Heesemans |
| 2007/0232396 A1 | 10/2007 | Yoo |
| 2008/0037534 A1 | 2/2008 | Shina |
| 2008/0207322 A1 | 8/2008 | Mizrahi |
| 2009/0094600 A1 | 4/2009 | Sargaison et al. |
| 2009/0111574 A1 | 4/2009 | Rowe |
| 2009/0111576 A1 | 4/2009 | Ostergren et al. |
| 2009/0118019 A1 | 5/2009 | Perlman |
| 2009/0119729 A1 | 5/2009 | Periman et al. |
| 2009/0215538 A1 | 8/2009 | Jew |
| 2009/0247295 A1 | 10/2009 | Weldon |
| 2010/0197405 A1 | 8/2010 | Douceur et al. |
| 2010/0229108 A1 | 9/2010 | Gerson et al. |
| 2010/0304860 A1 | 12/2010 | Gault et al. |
| 2010/0306813 A1 | 12/2010 | Perry et al. |
| 2011/0025689 A1 | 2/2011 | Perez |
| 2011/0055135 A1 | 3/2011 | Dawson et al. |
| 2011/0086706 A1 | 4/2011 | Zalewski |
| 2011/0088071 A1 | 4/2011 | Yerli |
| 2011/0096089 A1 | 4/2011 | Shenhav et al. |
| 2011/0145362 A1 | 6/2011 | Jones et al. |
| 2011/0157196 A1 | 6/2011 | Nave et al. |
| 2011/0210982 A1 | 9/2011 | Sylvan et al. |
| 2011/0225040 A1 | 9/2011 | Yerli |
| 2011/0250949 A1 | 10/2011 | van Os et al. |
| 2011/0256912 A1 | 10/2011 | Baynes et al. |
| 2012/0004039 A1 | 1/2012 | Perry et al. |
| 2012/0004041 A1 | 1/2012 | Pereira et al. |
| 2012/0004042 A1 | 1/2012 | Perry et al. |
| 2012/0009997 A1 | 1/2012 | Youm |
| 2012/0064968 A1 | 3/2012 | Youm et al. |
| 2012/0064976 A1 | 3/2012 | Gault et al. |
| 2012/0072911 A1 | 3/2012 | Whaley et al. |
| 2012/0079095 A1 | 3/2012 | Evans et al. |
| 2012/0299938 A1 | 11/2012 | Iwasaki |
| 2013/0046893 A1 | 2/2013 | Hauser et al. |
| 2013/0225287 A1 | 8/2013 | Bronstein Bendayan et al. |
| 2013/0344966 A1 | 12/2013 | Mustafa |
| 2014/0040970 A1 | 2/2014 | Alexander et al. |
| 2014/0179421 A1 | 6/2014 | Quinn et al. |

FOREIGN PATENT DOCUMENTS

| | | |
|---|---|---|
| EP | 2340877 A2 | 7/2011 |
| EP | 2340878 A2 | 7/2011 |
| WO | 99/32990 | 7/1999 |
| WO | 01/36061 | 5/2001 |
| WO | 2005/061068 | 7/2005 |
| WO | 2007119236 | 10/2007 |
| WO | 2012/107739 | 8/2012 |
| WO | 2012166305 A1 | 12/2012 |
| WO | 2013006802 | 1/2013 |
| WO | 2013023069 | 2/2013 |

OTHER PUBLICATIONS

Dance Central Game Manual released Nov. 4, 2010.*
PCT App. No. PCT/US2013/051180, International Search Report and Written Opinion, dated Oct. 14, 2013, 13 pages.
Bhuvan Urgaonkar et al. Agile Dynamic Provisioning of Multi-Tier Internet Applications, ACM Transactions on Autonomous and Adaptive Systems, vol. 3, No. 1, Mar. 1, 2008 (Mar. 1, 2008), pp. 1-39, XP055081646.
Non-Final Office Action dated Feb. 5, 2014 re U.S. Appl. No. 13/593,843 (26 pages).
Notification of Transmittal of the International Search Report and the Writen Opinion of the International Searching Authority, or the Declaration in PCT/US2013/76871 mailed Mar. 13, 2014, 11 pages.
PCT Search Report dated Mar. 27, 2014 re Appl. No. PCT/US2013/076918 (11 pages).
Non-Final Office Action dated May 30, 2014 in U.S. Appl. No. 13/554,215, 14 pages.
International Search Report with Written Opinion mailed Jul. 31, 2014 in Application No. PCT/US2014/022712, 11 pages.
Nathan, Day, "Building a True Real-Time Multiplayer Gaming Platform", Published on: Oct. 11, 2011, Available at: http://blog.softlayer.com/2011/building-a-true-real-time-multiplayer-gaming-platform/.
Shi, Shu, "Reduce Latency: The Key to Successful Interactive Remote Rendering Systems", In IEEE International Conference on Pervasive Computing and Communications Workshops (PERCOM Workshops), Mar. 21, 2011, pp. 391-392.
PCT Search Report dated Oct. 31, 2013 re PCT/US2013/055234, 9 pages.
Machida F et al., Just-In-Time Server Provisioning Using Virtual Machine Standby and Request Prediction, Autonomic Computing, 2008, ICAC, 08, International Conference On, IEEE, Piscataway, NJ USA, Jun. 2, 2008(Jun. 2, 2008), pp. 163-171, XP031276805.
Shaikh A et al., On Demand Platform for Online Games, IBM Systems Jounral, IBM Corp., Armonk, New York, US, vol. 45, No. 1, Jan. 1, 2003, pp. 7-19, XP002492825.
International Search Report with Written Opinion mailed Aug. 5, 2014 in Application No. PCT/US2014/023096, 10 pages.
Final Office Action dated Jan. 26, 2015 in U.S. Appl. No. 13/723,652, 12 pages.
Non-Final Office Action dated Apr. 10, 2015 in U.S. Appl. No. 13/593,843, 10 pages.
Final Office Action dated Sep. 29, 2014 in U.S. Appl. No. 13/593,843, 14 pages.
Notice of Allowance dated Oct. 20, 2014 in U.S. Appl. No. 13/554,215, 8 pages.
Non-Final Office Action dated Dec. 4, 2014 in U.S. Appl. No. 13/723,652, 11 pages.
Components of a Multiplayer Game, Published on: Jul. 11, 2011, 7 pages, available at: http://www.jenkinssoftware.com/raknel/manual/multiplayergamecomponents.html.
Jurgelionis, et al., "Platform for Distributed 3D Gaming", In International Journal of Computer Games Technology—Special Issue on Cyber Games and Interactive Entertainment, vol. 2009, Article ID 231863, Jan. 2009, 15 pages.
Wang, et al., "Modeling and Characterizing User Experience in a Cloud Server Based Mobile Gaming Approach", In Proceedings of the 28th IEEE Conference on Global Telecommunications, Nov. 30, 2009, pp. 1-7.

(56) References Cited

OTHER PUBLICATIONS

Chen, et al., "Measuring the Latency of Cloud Gaming Systems", In Proceedings of the 19th ACM International Conference on Multimedia, Nov. 28, 2011, pp. 1269-1272.
Marzolla, et al., "Dynamic Resource Provisioning for Cloud-based Gaming Infrastructures", In Proceedings of the ACM Computers in Entertainment, vol. 9, No. 4, Article 39, Mar. 2011, 19 pages.
Kim, et al., "Multi-view Rendering Approach for Cloud-based Gaming Services", In the Third International Conference on Advances in Future Internet, Aug. 21, 2011, pp. 102-107.
Claypool, et al., "Latency Can Kill: Precision and Deadline in Online Games", In Proceedings of the First Annual ACM SIGMM Conference on Multimedia Systems, Feb. 22, 2010, pp. 215-222.
Bernier, Yahn W., "Latency Compensating Methods in Client/Server In-game Protocol Design and Optimization", In Proceedings of the 15th Games Developers Conference, Mar. 2001, 13 pages.
Winter, et al., "A Hybrid Thin-Client Protocol for Multimedia Streaming and Interactive Gaming Applications", In 16th International Workshop on Network and Operating Systems Support for Digital Audio and Video, Nov. 22, 2006, 7 pages.
Kunsemoller, et al., "A Game-Theoretical Approach to the Benefits of Cloud Computing", Retrieved on: Jan. 30, 2012, Available at: http://www.my-groups.de/gecon2011/publications/Kuensemoeller_GECON2011.pdf.
Leung, et al., "Onlive Cloud Gaming Service", Published on: May 2011, 14 pages, SE 172/272 Enterprise Software, Available at: http://www.sjsu.edu/people/rakesh.ranjan/courses/cmpe272/s1/Team%20WS%20OnLive%20Cloud%20Gaming%20Service.pdf.
Office Action Issued in European Patent Application No. 13742806.6, Mailed Date: Jun. 24, 2015, 3 Pages.
Non-Final Office Action dated Jul. 30, 2015 in U.S. Appl. No. 13/723,652, 7 pages.
Non-Final Office Action dated Sep. 29, 2015 in U.S. Appl. No. 14/179,154, 14 pages.
Final Office Action dated Oct. 23, 2015 in U.S. Appl. No. 13/593,843, 16 pages.
Non-Final Office Action dated Jun. 30, 2016 in U.S. Appl. No. 14/607,238, 5 pages.
Notice of Allowance dated Aug. 8, 2016 in U.S. Appl. No. 13/723,652, 8 pages.
Final Office Action dated Feb. 12, 2016 in U.S. Appl. No. 14/179,154, 14 pages.
Non-Final Office Action dated Mar. 11, 2016 in U.S. Appl. No. 14/180,043, 32 pages.
Notice of Allowance dated Mar. 14, 2016 in U.S. Appl. No. 13/593,843, 8 pages.
Non-Final Office Action dated Apr. 7, 2016 in U.S. Appl. No. 13/723,652, 8 pages.
Chinese Office Action and Search Report Dated Sep. 9, 2016 in Chinese Patent Application No. 201380044324.9, 11 Pages.
Notice of Allowance dated Mar. 1, 2017 in U.S. Appl. No. 14/179,154, 5 pages.

* cited by examiner

CLIENT RENDERING OF LATENCY SENSITIVE GAME FEATURES

BACKGROUND

Video games may use controllers that generate rich data streams. For example, a depth camera may be used to generate a control signal for a video game. A depth camera generates a three-dimensional image of the space viewed by the camera. Other rich data streams include video and audio data. Player movement within the three-dimensional image may be detected and interpreted, perhaps in conjunction with other input data, to manipulate a video game.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention split game processing and rendering between a client and a game server. A rendered video game image is received from a game server and combined with a rendered image generated by the game client to form a single video game image that is presented to a user. Game play may be controlled using a rich sensory input, such audio data conveying speech and three-dimensional image data generated by a depth camera, or other device capable of generating three-dimensional image data. The three-dimensional image data describes the shape, size, and orientation of objects present in a play space. The play space is the area in which players are present and viewed by the input device.

The rich sensory input is received by a client device and then communicated to a game server, potentially with some preprocessing, and is also consumed locally on the client, at least in part. In one embodiment, latency sensitive features are the only features processed on the client and rendered on the client. For example, an avatar that moves in response to user actions captured in the three-dimensional image data may be rendered on the client while the rest of the video game image is rendered on the server. In addition to an avatar, latency sensitive game features, such as manipulation of real or virtual game objects that move in response to a user's movements, may also be rendered on the client. For example, if an avatar is holding a baseball bat, the baseball bat held by the avatar may also be rendered by the client. Where multiple players are located in view of the control input device, multiple avatars or game features directly linked to the multiple players may be client rendered. In a remote multi-game player setting where other players are connected via a network and are not in the same geographic location or play space, then the other player's avatars are rendered on the server.

BRIEF DESCRIPTION OF THE DRAWINGS

Embodiments of the invention are described in detail below with reference to the attached drawing figures, wherein.

DETAILED DESCRIPTION

Figure 1:
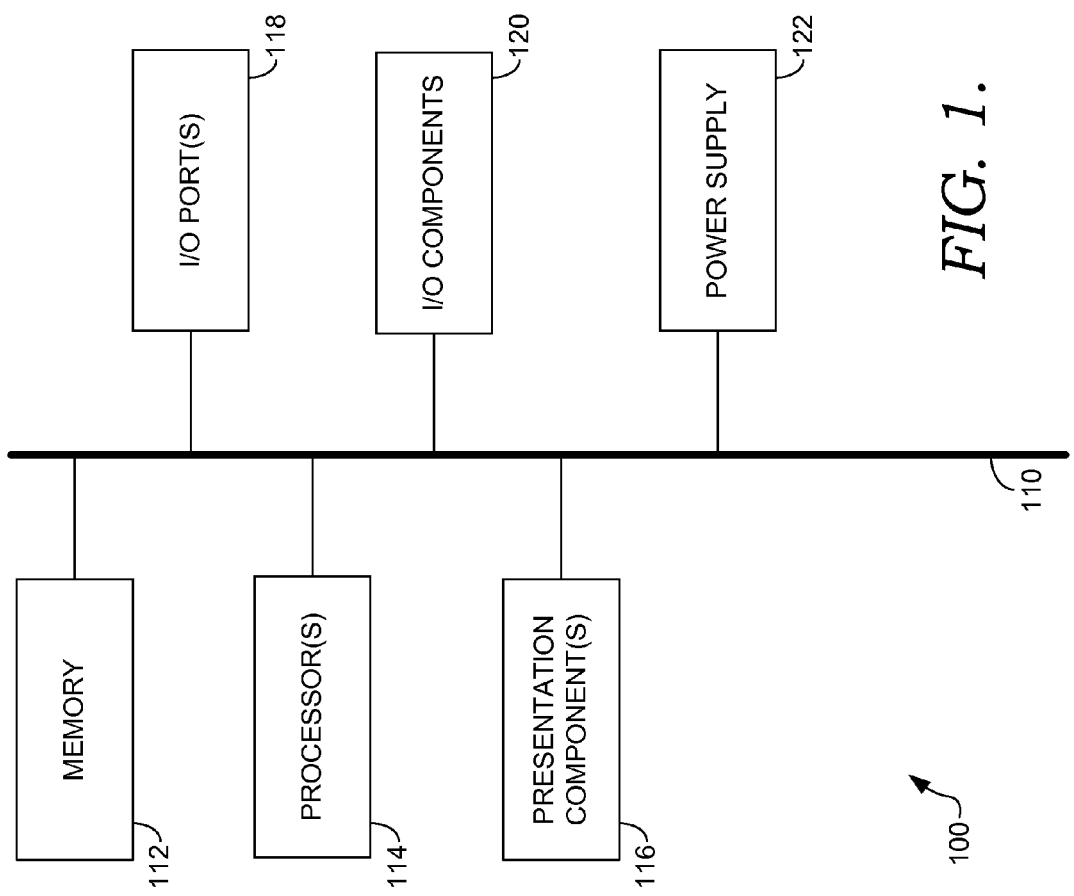
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention split game processing and rendering between a client and a game server. A rendered video game image is received from a game server and combined with a rendered image generated by the game client to form a single video game image that is presented to a user. Game play may be controlled using a rich sensory input, such audio data conveying speech and three-dimensional image data generated by a depth camera, or other device capable of generating three-dimensional image data. The three-dimensional image data describes the shape, size, and orientation of objects present in a play space. The play space is the area in which players are present and viewed by the input device.

The rich sensory input is received by a client device and then communicated to a game server, potentially with some preprocessing, and is also consumed locally on the client, at least in part. In one embodiment, latency sensitive features are the only features processed on the client and rendered on the client. For example, an avatar that moves in response to user actions captured in the three-dimensional image data may be rendered on the client while the rest of the video game image is rendered on the server. In addition to an avatar, latency sensitive game features, such as manipulation of real or virtual game objects that move in response to a user's movements, may also be rendered on the client. For example, if an avatar is holding a baseball bat, the baseball bat held by the avatar may also be rendered by the client. Where multiple players are located in view of the control input device, multiple avatars or game features directly linked to the multiple players may be client rendered. In a remote multi-game player setting where other players are connected via a network and are not in the same geographic location or play space, then the other player's avatars are rendered on the server.

Embodiments of the present invention split game processing and rendering between a client and a game server. A rendered video game image is received from a game server and combined with a rendered image generated by the game client to form a single video game image that is presented to a user. Game play may be controlled using a rich sensory input, such audio data conveying speech and three-dimensional image data generated by a depth camera, or other device capable of generating three-dimensional image data. The three-dimensional image data describes the shape, size, and orientation of objects present in a play space. The play space is the area in which players are present and viewed by the input device.

The rich sensory input is received by a client device and then communicated to a game server, potentially with some preprocessing, and is also consumed locally on the client, at least in part. In one embodiment, latency sensitive features are the only features processed on the client and rendered on the client. For example, an avatar that moves in response to user actions captured in the three-dimensional image data may be rendered on the client while the rest of the video game image is rendered on the server. In addition to an avatar, latency sensitive game features, such as manipulation of real or virtual game objects that move in response to a user's movements, may also be rendered on the client. For example, if an avatar is holding a baseball bat, the baseball bat held by the avatar may also be rendered by the client. Where multiple players are located in view of the control input device, multiple avatars or game features directly linked to the multiple players may be client rendered. In a remote multi-game player setting where other players are connected via a network and are not in the same geographic location or play space, then the other player's avatars are rendered on the server.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
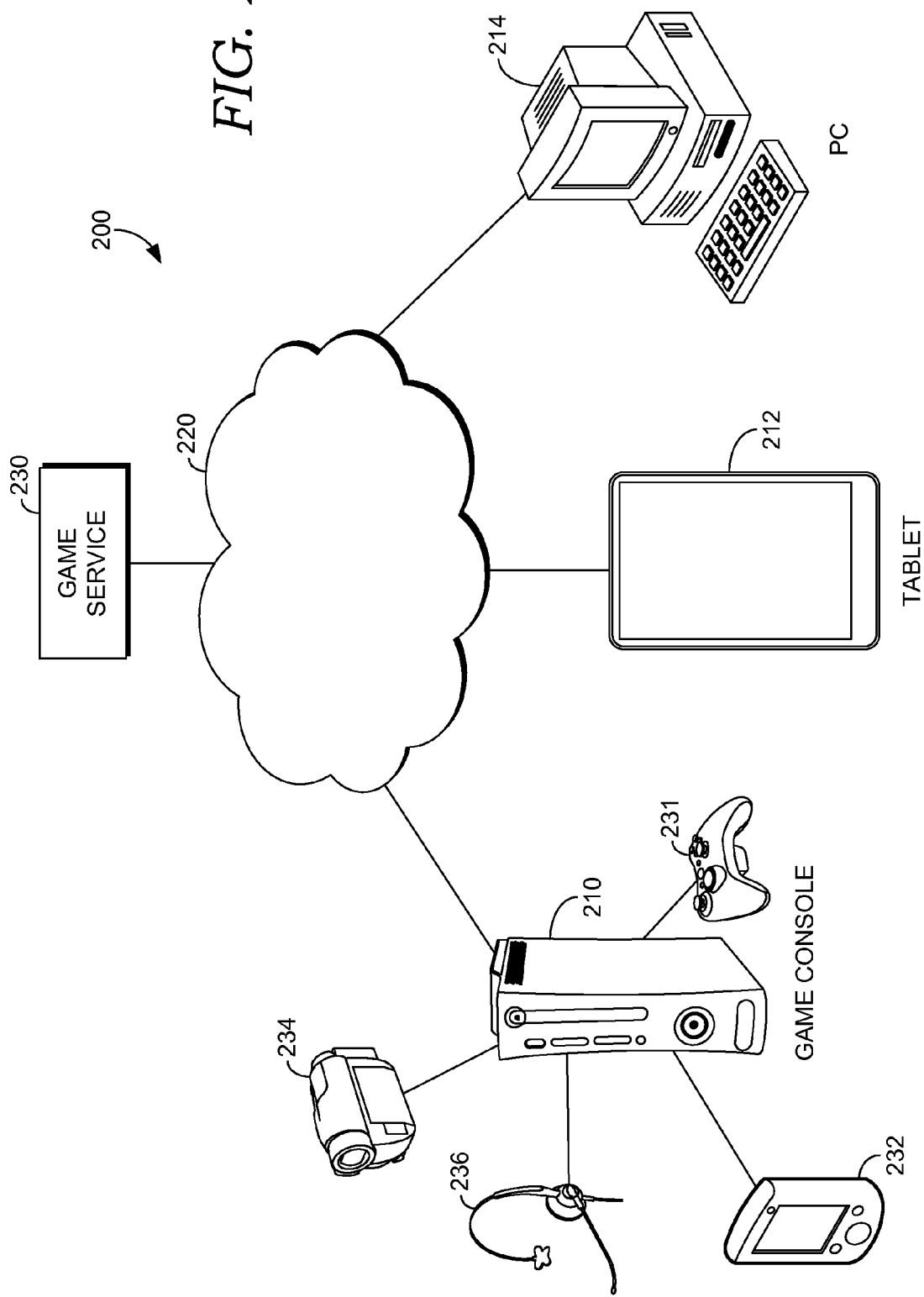
FIG. 2 is a diagram of online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones and televisions, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 231, tablet 232, headset 236, and depth camera 234. A game console may be associated with control devices that generate both a rich data stream and a basic data stream. Individual controllers are capable of generating different kinds of data streams and a single controller could generate both a rich data stream and an basic data stream.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

The classification of an input stream as rich or basic depends on the latency caused to the game by uploading the full control stream. Factors such as available bandwidth and client capabilities may affect the classification. In one embodiment, a data stream that adds more than 80 ms of roundtrip latency during communication to a game server is classified as rich. Roundtrip latency refers to the total delay between the user providing an input, such as pushing a button, and seeing the result (e.g., avatar movement) of the input on the display. Unless otherwise specified in this disclosure, the term latency refers to roundtrip latency. Thus, the terms latency and roundtrip latency are used interchangeably. The 80 ms of latency is in addition to latency added by baseline processing on the client and server. Different games may establish different latency standards. Further, different game features may have different latency tolerance.

Embodiments of the present invention may make a contextual determination of what constitutes a rich data stream for a particular game, under particular circumstances. Each game may have a roundtrip latency-sensitivity rating. The roundtrip latency-sensitive rating may be determined from user feedback collected from test groups, or through another method, and associated with the game. The latency sensitivity rating may be different for different game features or the same for the entire game. For example, avatar movement may be given a different sensitivity rating than background movement.

The rich or basic classification for each input stream may be determined by identifying the latency sensitivity rating for the present game, determining available bandwidth, and determining client and server processing capabilities. The various factors may be combined to determine latency created for the control stream. If it is less than the latency sensitivity rating then the control stream is basic, if greater than the latency sensitivity rating then rich.

In an embodiment, the latency associated with a control stream is determined experimentally using a test control input and test game response. The measured latency is used to determine whether the control is basic or rich.

When the control is determined to be rich via experimentation or calculation, then client side preprocessing of the control stream may be used. Various preprocessing methods are described in more detail subsequently. If the control is basic, then it is uploaded without being transformed to a reduced control input, but it may still be processed according to various transport protocols and other processing involved in communicating the control signal to the server. This other processing occurs to both pre-processed and unprocessed control signals.

When certain features are latency sensitive, then those features may be rendered on the client and combined with rendered images received from the server. A feature may be latency sensitive regardless of the control input. For example, avatar movement may be latency sensitive regardless of the whether the avatar is controlled using a depth camera or joystick.

The tablet 232 can be both a game controller and a game client. Tablet 232 is shown coupled directly to the game console 210, but the connection could be indirect through the Internet or a subnet. In one embodiment, the game service 230 helps make a connection between the tablet 232 and the game console. The game service 230 may associate devices when the devices log in using the same identification or identification codes that are linked. Users may also ask that devices be linked through the game service 230 for use as input or companion devices. The tablet 232 is capable of generating numerous control streams and may also serve as a display output mechanism. In addition to being a primary display, the tablet 232 could provide supplemental game information different from, but related to information shown on a primary display coupled to the game console 210, or simply be a control surface. The input streams generated by the tablet 232 include video and picture data, audio data, movement data, touch screen data, and keyboard input data.

The depth camera 234 generates three-dimensional image data used as a control input. The depth camera 234 may use infrared camera to determine a depth, or distance from the camera for each pixel captured. Stereoscopic depth cameras are also possible. In addition, the depth camera 234 may capture a color video stream or picture. The depth camera 234 may have several image gathering components. For example, the depth camera 234 may have multiple cameras. The depth camera 234 may be used to create user interface though which the user makes gestures and speaks audio commands to control game. The user may have no other controller. In other embodiments, the depth camera 234 may be used in combination with other control input.

The headset 236, captures audio input from a player and the player's surroundings and may also act as an output device if it is coupled with a headphone or other speaker.

Game service 230 may comprise multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

The game service 230 allows the game to be executed within the computing devices provided by the game service 230. A communication session between the game service and game clients carries input traffic to the game service 230 and returns a rendered game image. In this embodiment, a computing device that is part of the game service executes the video game code using a control stream generated by input devices associated with the various game clients. The rendered video game is then communicated over the network to the game client where the rendered game is output for display.

Exemplary Game Client and Game Service for Remote Gaming

Figure 3:
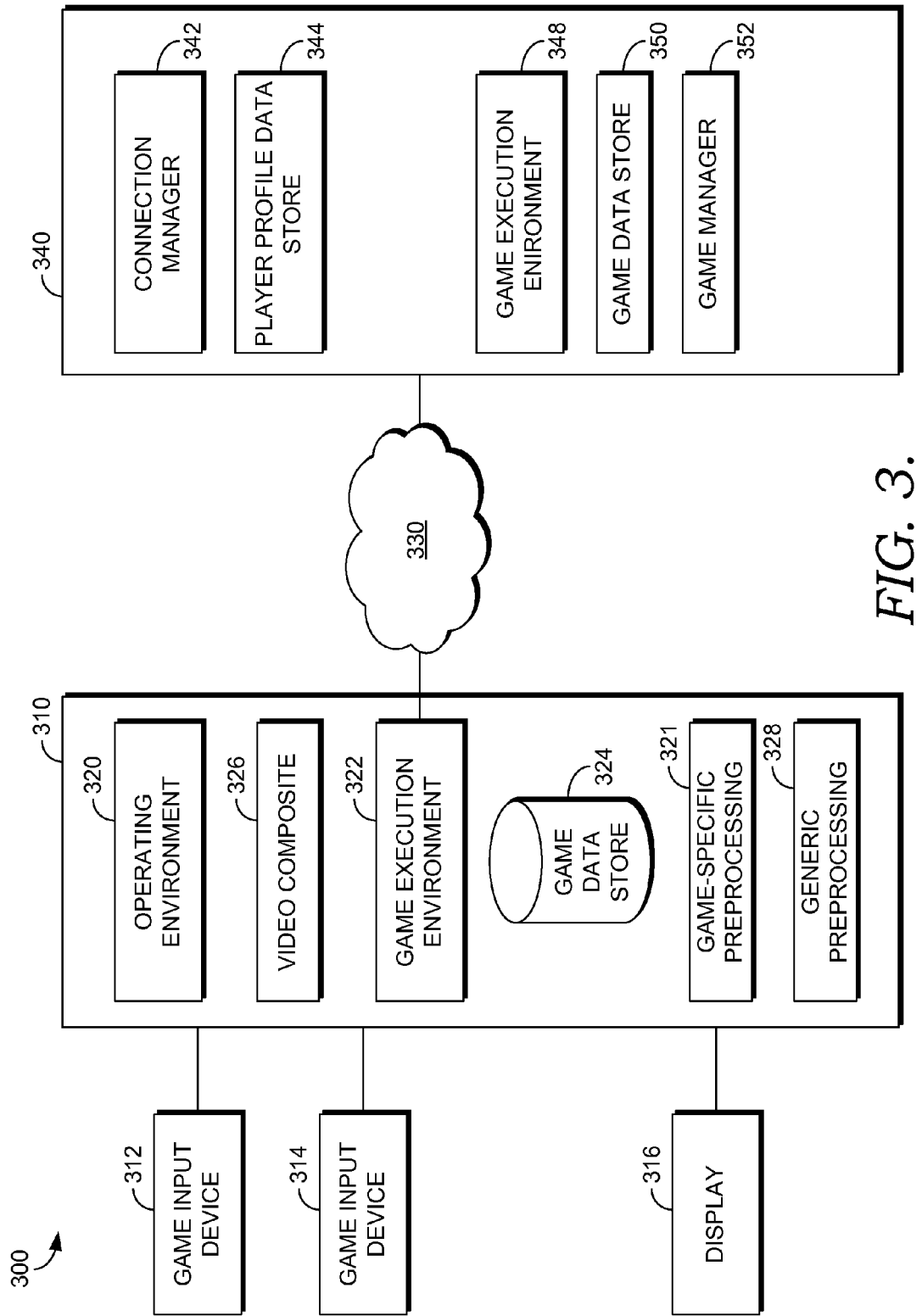
FIG. 3 is a diagram of a remote gaming computing environment, in accordance with an embodiment of the present invention.

Turning now to FIG. 3, a remote gaming environment 300 using rich input control data is shown, in accordance with an embodiment of the present invention. The gaming environment 300 includes a game client 310 communicatively coupled to a game server 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, movement aware devices (e.g., accelerometer and/or gyroscope equipped devices), a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, a game data store 324, a game-specific preprocessing component 326, and a generic preprocessing component 328.

The operating environment 320 may be provided by an operating system that manages the hardware and provides services to application running on the game client 310. The operating environment may allocate client resources to different applications as part of the pre-processing and other functions.

The game data store 324 stores downloaded games and partially downloaded games. Games may be downloaded in playable blocks. To play a game, the game may need to be loaded from the game data store 324 into active memory associated with the game execution environment 322. The game data store 324 may also store player progress files.

The game-specific preprocessing component 326 processes a rich controller input to generate a reduced controller input. The reduced controller input can take many forms and can vary depending on the type of rich controller input involved.

When the rich control input is three-dimensional image data, the reduced controller input generated by the client may take the form of skeletal tracking data, a reduction to surfaces, a reduction to geometry, deltas, compressed imagery, and a reduction to bounding boxes. Each of these will be described in more detail subsequently, but they all result in control data comprising less data to communicate to the controller. The reduced controller input is communicated over network 330 to the game execution environment 348 on the game server 340. The reduced controller input is used as an input that controls the game in progress.

The game-specific preprocessing 326 is specific to the particular game being executed. While the steps may be similar to the generic preprocessing described subsequently, a part of the game-specific processing is specific to a particular game. The code may be game specific to generate an output in a form that is consumable to the particular game. In other words, game specific code may be used to generate a compatible control signal. In other cases, the game specific code does something unique that other games do not do.

In one embodiment, the game-specific preprocessing generates a control input that is specific to the game. For example, a hand gesture could be interpreted to mean move the avatar right or to pick up an object in a first game, but something different in a second game. In this case, the reduced controller input would simply be a movement command instead of the three-dimensional image data. Interpreting three-dimensional image data to recognize a gesture and form a movement command is a transformation of one type of input data (depth data) to a second type (movement). Taking this one-step further, the movement data or depth data could be converted to a control command, such as "throw ball" or "pause game." This is described as transformation to control. In other embodiments, relevant control data is separated from irrelevant control data, but does not change form. For example, reduced controller input could be a portion of the three-dimensional image around an object of interest, such as a player's face or hand, without the rest of the three-dimensional image data. Isolating a portion of image data (3D or 2D) is described as a reduction to a bounding box. In the game-specific preprocessing of audio commands, the reduced controller input could be a unique game command or a common game command described in a game specific way, such as use of game specific slang.

In one embodiment, the game-specific preprocessing component 326 is extracted or based on a video game originally written to be processed entirely on the client side. In this manner, the part of the video game that processes the rich controller inputs is separated and put on the client side and the commands for other game functions are sent up to the execution part of the game, which resides on the server 340. In this case, there may be a need to reconcile data that would have otherwise been processed instantaneously within the game execution environment on a client. The signal reconciliation component 346, explained in more detail subsequently, may perform this reconciliation.

The generic preprocessing 328 preprocesses the rich data input in a way that is applicable to or consumable by multiple games. The reduced controller input generated by the generic preprocessing component 328 is communicated over network 330 to the game execution environment 348 where it may be used to manipulate the game in progress. The examples of generic preprocessing steps include skeletal tracking, deltas, reduction to services, reduction to geometry, reduction to bounding boxes, and three-dimensional image compression. When the rich data input includes audio signals the generic processing could be a speech-to-text translation. For example, the user could speak the word "pause" and the generic preprocessing could send a command to pause the game.

The game execution environment 322 comprises the gaming resources on the client 310 uses to execute instances of a game or part of a game. In some embodiments, the client 310 does not include a game execution embodiment or the computing resources to execute the full game. The game execution environment 322 comprises active memory along with computing and video processing. The game execution environment 322 receives gaming controls and causes the game to be manipulated and progressed according to its programming. In one embodiment, the game execution environment 322 outputs a rendered video stream that is communicated to a display device.

In other embodiments, the game execution environment 322 outputs only code related to latency sensitive game features. Latency sensitive features of a game may be designated by a game developer and may also be dynamically determined. In one embodiment, the game service 340 communicates game code needed to execute only the latency sensitive features. The execution environment 322 may not have resources or the code to execute the entire game. The game execution environment 322 may execute part of a game to generate game images that are combined by the video composite component 321 with rendered images received from the game server 340.

The video composite component 321 merges rendered video game images received from the game server 340 with rendered video game images rendered by the client 310 to form a single image that is output to display 316. The video composite component may perform scaling and other functions to generate a video output that is appropriate.

The game server 340 comprises a connection manager 342, a player profile data store 344, a signal reconciliation component 346, a game execution environment 348, a game data store 350, and a game manager 352. Though depicted as a single box, the game server 340 could be a server farm that comprises numerous machines, or even several server farms.

The connection manager 342 builds a connection between the client 310 and the server 340. The connection manager 342 may also provide various authentication mechanisms to make sure that the user is authorized to access the game service provided by the server 340. The connection manager 342 may also analyze the bandwidth available within a connection and provide this information to components as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. As a player progresses through a game, the player's score and access to game levels may be stored. Further, the player profile data store 344 may store information about individual player preferences such as language preferences. Information regarding a player's game client and speed of the network connection may also be stored and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored. The usage information may be analyzed to suggest games of interest to an individual player. In one embodiment, the purchase history may include games that are not purchased through the game service. For example, the purchase history may be augmented by the player entering in a key from a game purchased in a retail store. In some embodiments, the player may then have access to that game both on their game client 310 and through the game service.

The game execution environment 348 comprises the gaming resources on the game server 340 uses to execute instances of a game or part of a game. The game execution environment 348 comprises active memory along with computing and video processing. The game execution environment 348 receives control signals from the game client 310 and causes the game to be manipulated and progress according to its programming. In one embodiment, the game execution environment 348 outputs a rendered video stream that is communicated to the game client. In other embodiments, the game execution environment 322 outputs game geometry, or other representations, which may be combined with local objects on the gaming client to render the gaming video. The game execution environment 322 may execute part of a game to generate game images that are communicated to the game client 310 for combination with rendered images generated by the game client 310.

Figure 4:
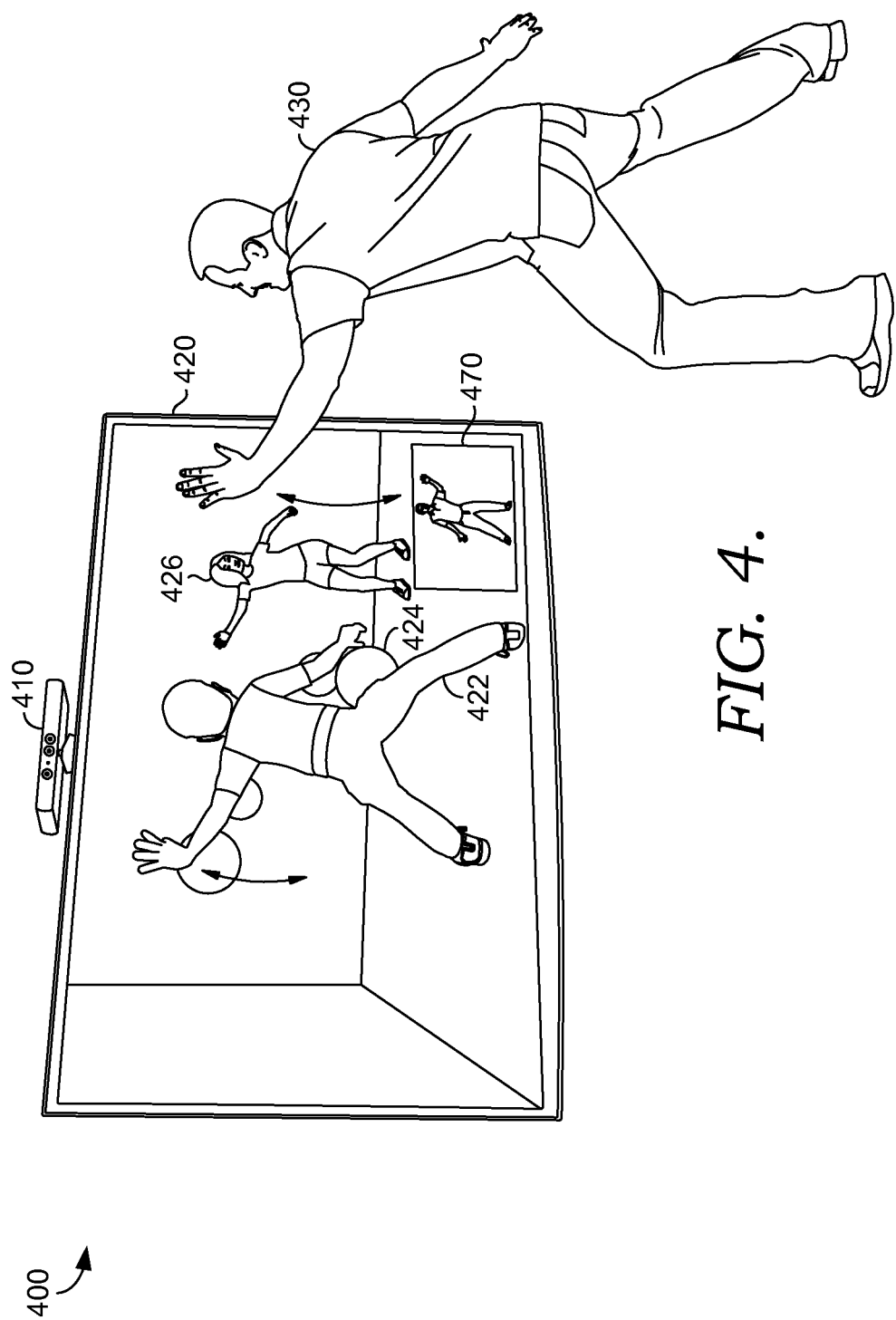
FIG. 4 is a diagram of a gaming interface generated using a rich data stream, in accordance with an embodiment of the present invention.

Turning now to FIG. 4, an exemplary depth camera interface is shown, in accordance with an embodiment of the present invention. The depth camera 410 has a view of the player 430. A depth camera 410 generates three-dimensional image data that is able to capture the player's 430 movement. In this case, the player 430 is moving their left arm up and down. A game console or game server receives the input from the depth camera 410 and uses it to manipulate the avatar 422 shown on display 420. As can be seen, the movements of the avatar 422 interact with virtual objects 424 and a second player 426. A different person connected to the same game session through the game server may control the second player 426. The virtual objects 424 are balls. The user's movements are able to form a control input when captured by the depth camera 410.

FIG. 4 also includes a picture-in-picture ("PIP") image 470 of the player 430. This may be a standard video image captured by the depth camera 410 or some other camera. The PIP image may be rendered on the client without sending the image to the game server because PIP may be latency sensitive.

Figure 5:
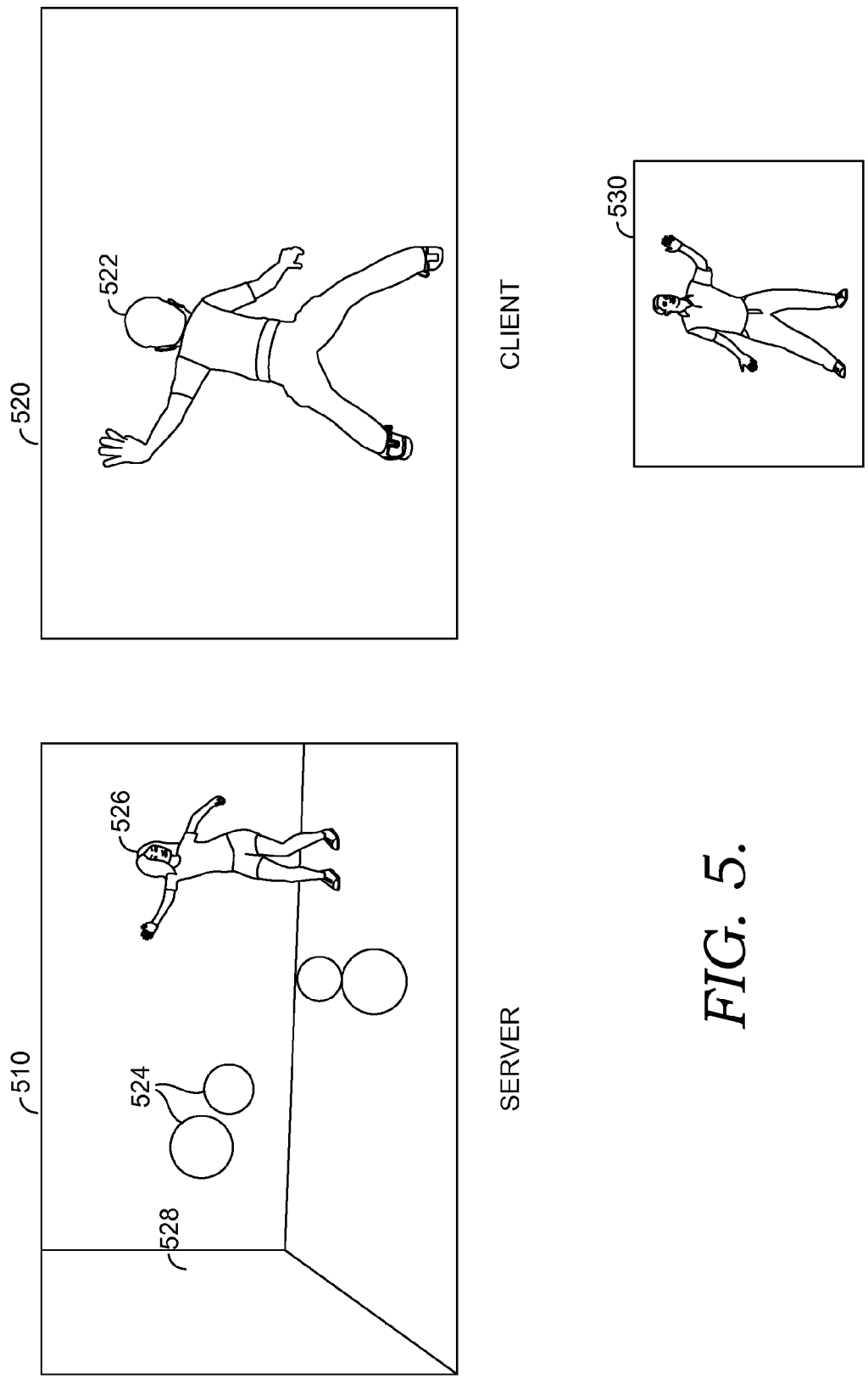
FIG. 5 is diagram illustrating compositing three rendered images are illustrated, in accordance with an embodiment of the present invention.

Turning now to FIG. 5, three rendered images are illustrated, in accordance with an embodiment of the present invention. The rendered images include server rendered image 510, client rendered avatar 520, and client rendered picture-in-picture 530. These three rendered images are composited together to form the image shown previously in FIG. 4. The rendered images generated by the server may also be sent with depth buffer data in addition to colored image data. The depth buffer data is used to order the client rendered images and the server rendered images during the composite process. For example, the client may render an avatar that is partially obscured by an object rendered by a server when the images are composited. The depth data is used to composite the images in the correct depth order. The server rendered image 510 includes both foreground and background images that are non-latency sensitive in the illustrated game. The server rendered image 510 includes the background area 528, virtual game objects 524, and remote player avatar 526. Virtual game objects 524 are manipulated based on actions taken by the player locally and the second player remotely. As mentioned previously, both players are participating in the same game using different input devices. The game is being executed in a remote server's game execution environment.

The avatar 522 is rendered by the client. Delays in avatar 522 movement that might result if the avatar was rendered by the server can lessen the enjoyment of the game. Note that the avatar 522 and the virtual objects 524 are both manipulated as a result of control input received at the client. At least part of the control input is sent to the server and at least part of the control input is consumed by the client. In one embodiment, the entire control input is sent to the server and the entire control input is consumed by the client, but only to execute and render designated game features.

The picture-in-picture 530 is also rendered by the client. In one embodiment, the video image is not communicated to the server along with the other controller input. If the video image is communicated to the server, it is also consumed by the client to generate the PIP image. As mentioned, the three rendered images are composited to form a single video game image that is output to the user.

Figure 6:
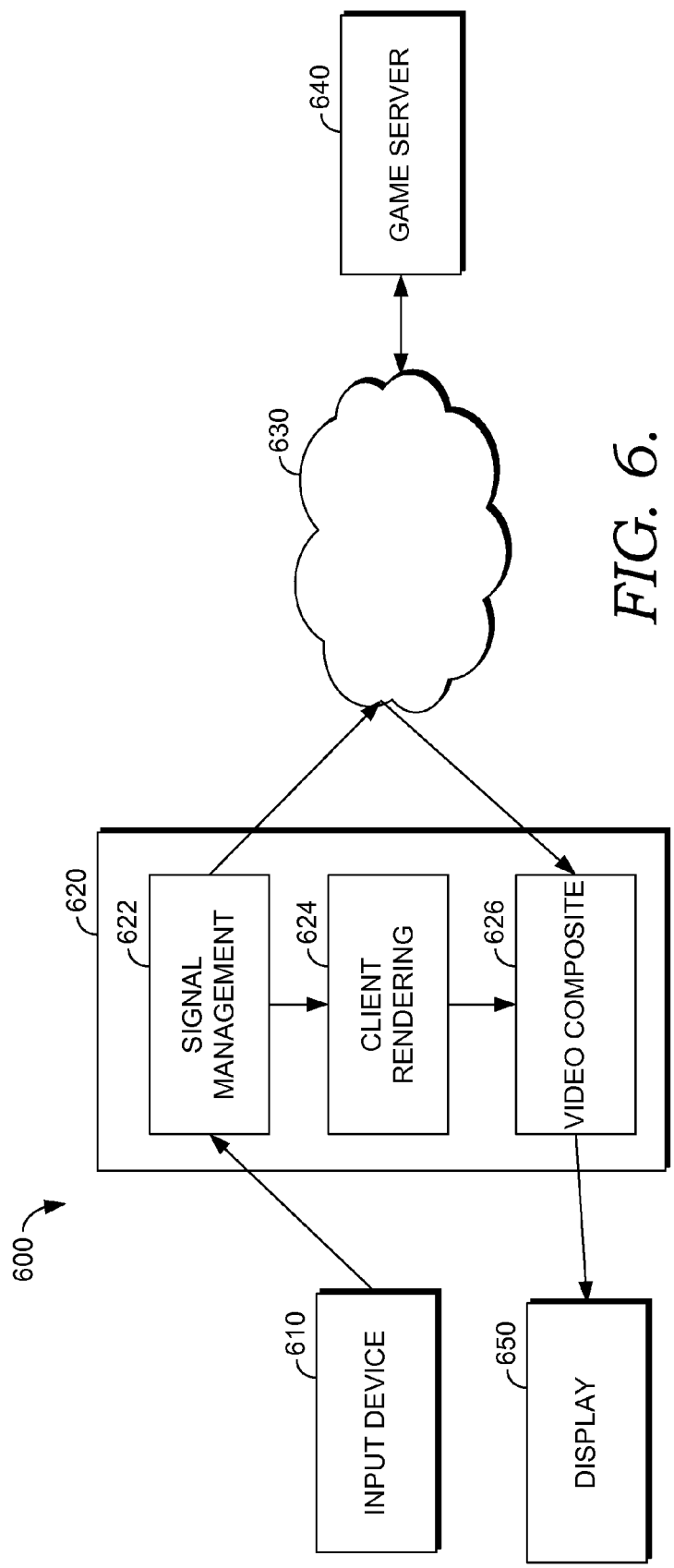
FIG. 6 is a diagram illustrating data flow through a split rendering process, in accordance with an embodiment of the present invention.

Turning now to FIG. 6, data flow through a possible embodiment of the present invention is illustrated. The remote gaming environment 600 includes an input device 610, a game client 620, a network 630, a game server 640, and a display 650. The input device 610 generates a rich data signal, such as three-dimensional image or video data. Other examples of rich data streams have been described previously. The game client 620 may be a game console or other computing device. Network 630 may be similar to network 330 described previously and may include the Internet. Game server 640 may be similar to game server 340 described previously.

Game server 640 executes a video game that has been manipulated in response to control signals received from the game client 620. The display 650 may be a television, monitor, or other display integrated into a computing device such as a slate or smart phone. In embodiments of the invention, the display 650 may be integrated into the game client 620. For example, the game client 620 may be a slate or laptop computer that has an integrated display. It should be mentioned that the input device 610 may also be integrated into the game client 620 in some embodiments of the present invention. For example, a game client could have a depth camera integrated into the body of the game client 620.

Initially, the input device 610 generates a rich data signal that is sent to a signal management component 622 on the game client 620. The rich data signal may be three-dimensional image data generated by a three-dimensional capture device. The signal management component 622 directs all, or portions, of the control signal to the appropriate destinations. The signal management component 622 may also perform various preprocessing on the data signal to prepare it for consumption by the client rendering component 624 or the game server 640.

The signal management component 622 sends at least part of the signal, preprocessed or otherwise, through network 630 to the game server 640. The game server 640 consumes the signal to manipulate an ongoing game session and to render a video game image. Roughly simultaneously the signal management component 622 communicates at least part of the video game input signal to the client rendering component 624. For the sake of simplicity, the client rendering component 624 is indicated as a single component. However, a the client rendering component 624 may be part of a game execution environment or be related to other components not shown that execute part of the game in response to the signal.

The client rendering component 624 generates a client rendered video game image that is different than the server-rendered video game image generated based on the same or similar signals. Generally, the client rendering component 624 generates images of a particular game feature that is latency sensitive or more convenient to render on the client 620. In order to render the image, at least part of the video game must be executable on the client 620. Further, the client may need environmental geometry describing the playing environment surrounding the player's avatar in order to calculate appropriate movements. For example, the game client 620 would need to know the avatar is standing in front of a wall, and not move the avatar forward in response to a move forward instruction. The avatar may similarly navigate around objects, fall, leap, or perform other actions depending on environmental conditions. The code on the game client 620 is able to determine avatar movements that are appropriate for the environmental conditions, including other player locations, and game factors, such as player power level. For example, an instruction to jump would not be followed by the client if the present game state indicated the player lacked the present ability to jump.

The game server 640 may periodically send game state information to the client 620 for use in the client side game code. The game state information may include environmental geometry describing land, objects, and other players. In one embodiment, the client does not track the overall game progress, track game points, scores, etc. For example, the game client 620 may render an avatar moving the left arm, but not have awareness whether or not the arm contacted a ball or whether the resulting ball movement scored a point. The client may ultimately output a composite image showing the arm hitting the ball, but the game code may not know other game information beyond what is needed to render the avatar changes, or other latency sensitive features.

The rendered video game image from the game server 640 and the client rendering component 624 are both received by the video composite component 626. The video composite component forms a single video game image that is output to the display 650.

Figure 7:
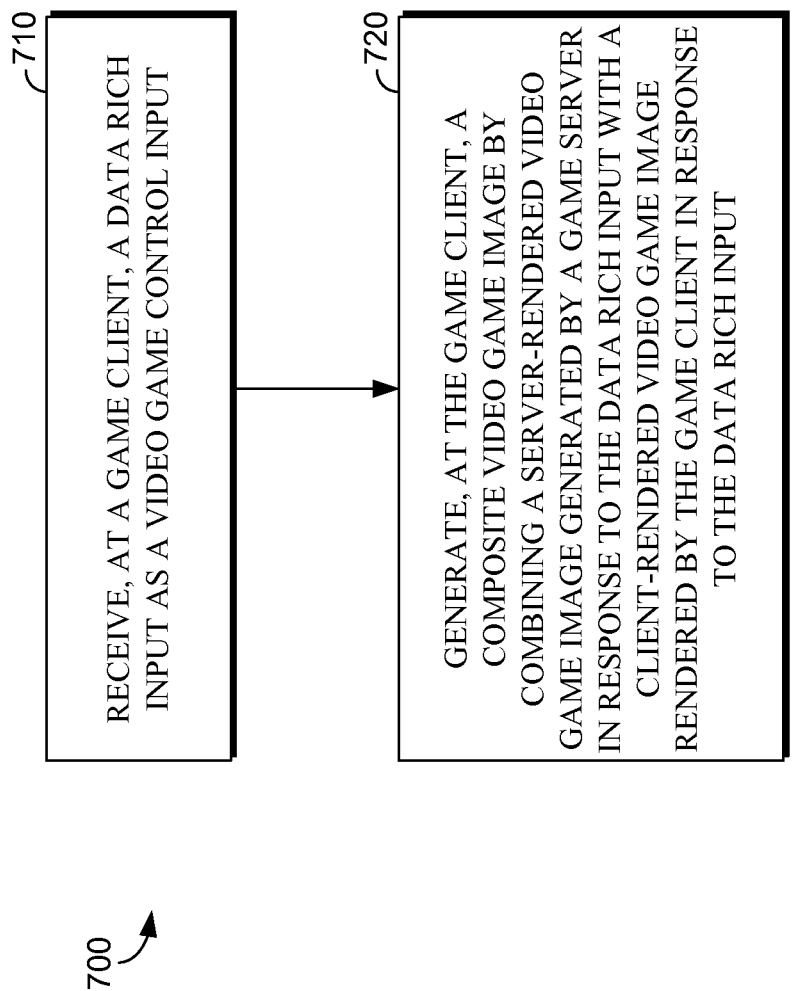
FIG. 7 is a flow chart showing a method of enabling game play over a remote connection using a data rich input device, in accordance with an embodiment of the present invention.

Turning now to FIG. 7, a method 700 of playing a video game using rich sensory data as a control input in a server based gaming environment is shown, in accordance with an embodiment of the present invention. The server based gaming environment may be similar to the remote gaming environment described previously with reference to FIG. 3. In general, a game client receives rich sensory input locally and communicates all or part of this information to a game server that executes the game and generates a video game image.

At step 710, data rich control input is received as a video game input control at the game client. The data rich control input may be generated by a depth camera that reflects the size and shape of objects in a volume of space in view of the camera. The data rich control input may be speech data received by a microphone or movement data captured by an accelerometer or gyroscope equipped device. The input device may integrated into the game client, such as a camera or microphone integrated into a slate or personal computer. The input device may be located nearby and communicatively coupled to the game client via a wired or wireless connection. Received by the game client does not need to mean the input is received from an external device. Received by the game client could mean generated by the game client and received by a component on the game client, such as signal component 622 or client rendering component 624, described previously, or a combination of components within a game execution environment that handles game function on the game client.

At step 720, an integrated video game image is generated at the client by combining rendered video game images generated in response to the data rich control input that are received from a game server with video game images rendered by the game client in response to the data rich control input. Thus, a single video game image is created by combining a video game image rendered by the game server with a video game image rendered by the game client. The images rendered by the game server and those rendered by the game client are different. In one embodiment, the two images do not have features in common. For example, a first avatar is only present in the client-rendered video game image and is not present in the server rendered image. Similarly, game objects or a second player may be rendered in the server generated image and not be present in the client rendered image.

In one embodiment, the client generated image is a picture-in-picture video generated based on the data rich control input or additional input data comprising color video. In one embodiment, the picture-in-picture is a green screen image showing the player in isolation from background and surrounding objects.

In one embodiment, the client only renders latency sensitive features. Latency sensitive features may vary from game to game. Latency sensitive features are those where a player will experience a degraded game experience when the video game appearance does not change in response to control input within a latency threshold. The latency threshold for each game or game feature may be determined by developers and associated with the game. In one embodiment, game features are latency sensitive if more than a 50 ms delay causes game play degradation. In one embodiment, code used to render an image of the latency sensitive feature is communicated to the game client.

The latency sensitive game feature may be defined narrowly. For example, a first movement of the avatar may be latency sensitive, while a second movement, which is different is not. For example, jumping may be latency sensitive while walking is not. The client side game code may first interpret the game control input and determine whether a latency sensitive game feature is manipulated by the control input. When a latency sensitive game feature is manipulated then it may be rendered by the client. When no latency sensitive game features are manipulated the entire image may be server rendered and client code would not render any images. For example, when the control input opens a menu that pauses the game, the entire menu navigation may be server rendered.

In another example, avatar appendages (e.g., hands, arms, legs, feet, and head) are latency sensitive, while the rest of the body is not. In this case, the client would only render images of the appendages to be combined with a server rendered image that includes the avatar body.

The list of latency sensitive game features rendered by the game client may change as conditions change. For example, as network conditions slow and latency created by the network increases, additional features may be rendered by the client. When network conditions slow, it may take longer for control input to be communicated to the game service and a rendered image to be communicated back to the game client. The total transaction time taken to perform this exchange of information may be monitored during a game session and compared against each game features latency threshold. The game client may do this comparison or the game server. When the total transaction time exceeds a latency threshold for a game feature then the client will begin rendering that game feature. When the total transaction time falls below the latency threshold then the game feature may again be rendered by the server. In this way, rendering of certain game features may migrate between the client and server depending on network conditions and latency thresholds associated with the game features. The server may also monitor network conditions and send an explicit instruction to the game client to begin rendering a particular feature.

Figure 8:
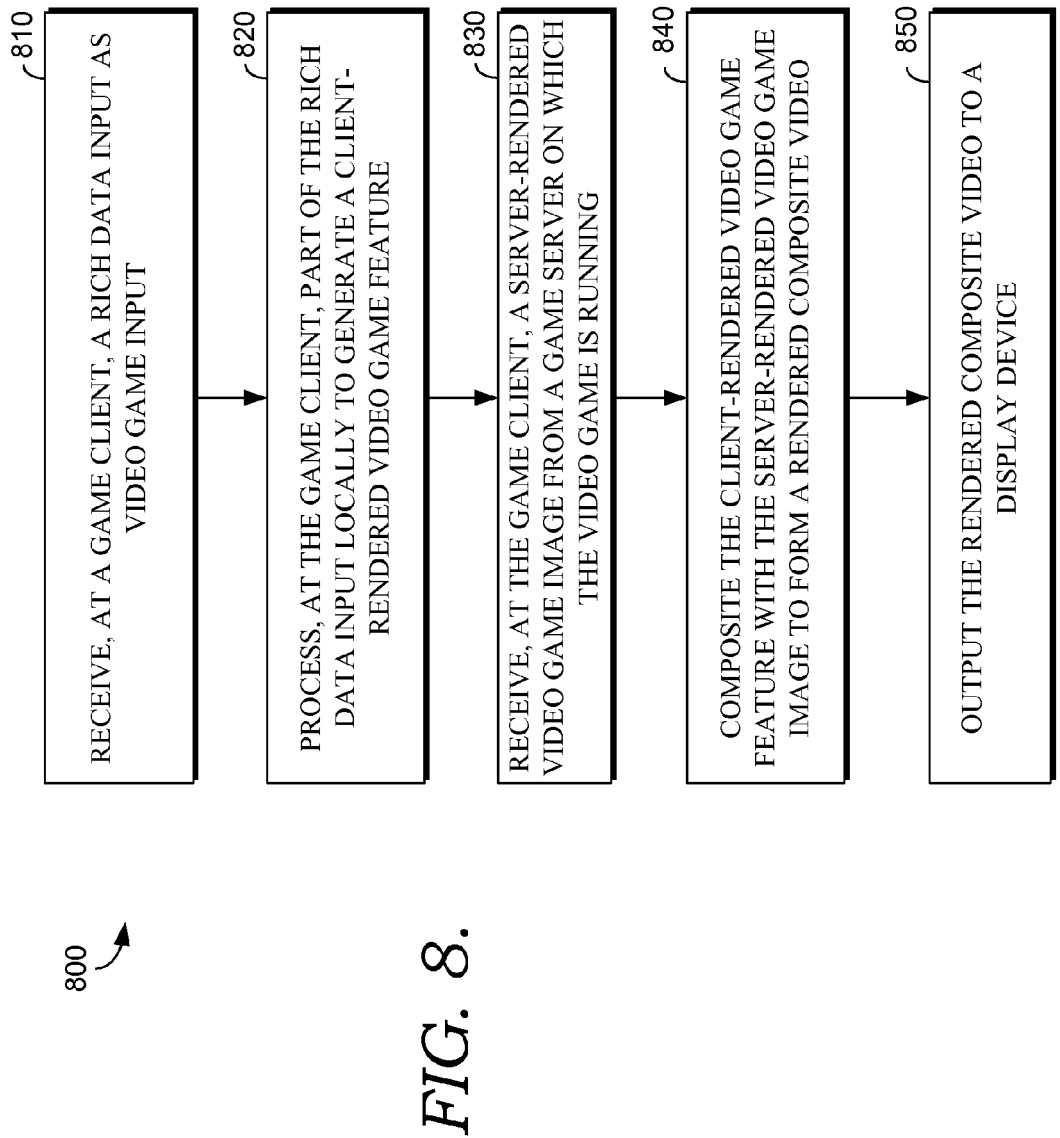
FIG. 8 is a flow chart showing a method of enabling game play over a remote connection using a data rich input device, in accordance with an embodiment of the present invention.

Turning now to FIG. 8, a method 800 for playing a video game using data rich control input as a control input is shown, in accordance with an embodiment of the present invention. Method 800 may be executed in a remote gaming environment similar to the one described previously with reference to FIG. 3.

At step 810, data rich control input is received at a game client. The input device may integrated into the game client, such as a camera or microphone integrated into a slate or personal computer. The input device may be located nearby and communicatively coupled to the game client via a wired or wireless connection. Received by the game client does not need to mean the input is received from an external device. Received by the game client could mean generated by the game client and received by a component on the game client, such as signal component 622 or client rendering component 624, described previously, or a combination of components within a game execution environment that handles game function on the game client.

At step 820, part of the data rich control input is processed locally at the game client to generate a rendered video game feature. The processing may be done using game specific code running on the game client. Game specific code is code associated with the game running on a game server that is not capable of executing an entire game but is capable of generating certain images that is combinable with an image of the overall game being executed at a game server.

At step 830, a rendered video game image is received at the game client from a game server on which the video game is running. At step 840, the rendered video game feature is composited with the rendered video game image to form a final rendered video. At step 850, the rendered video is output to a display device.

Figure 9:
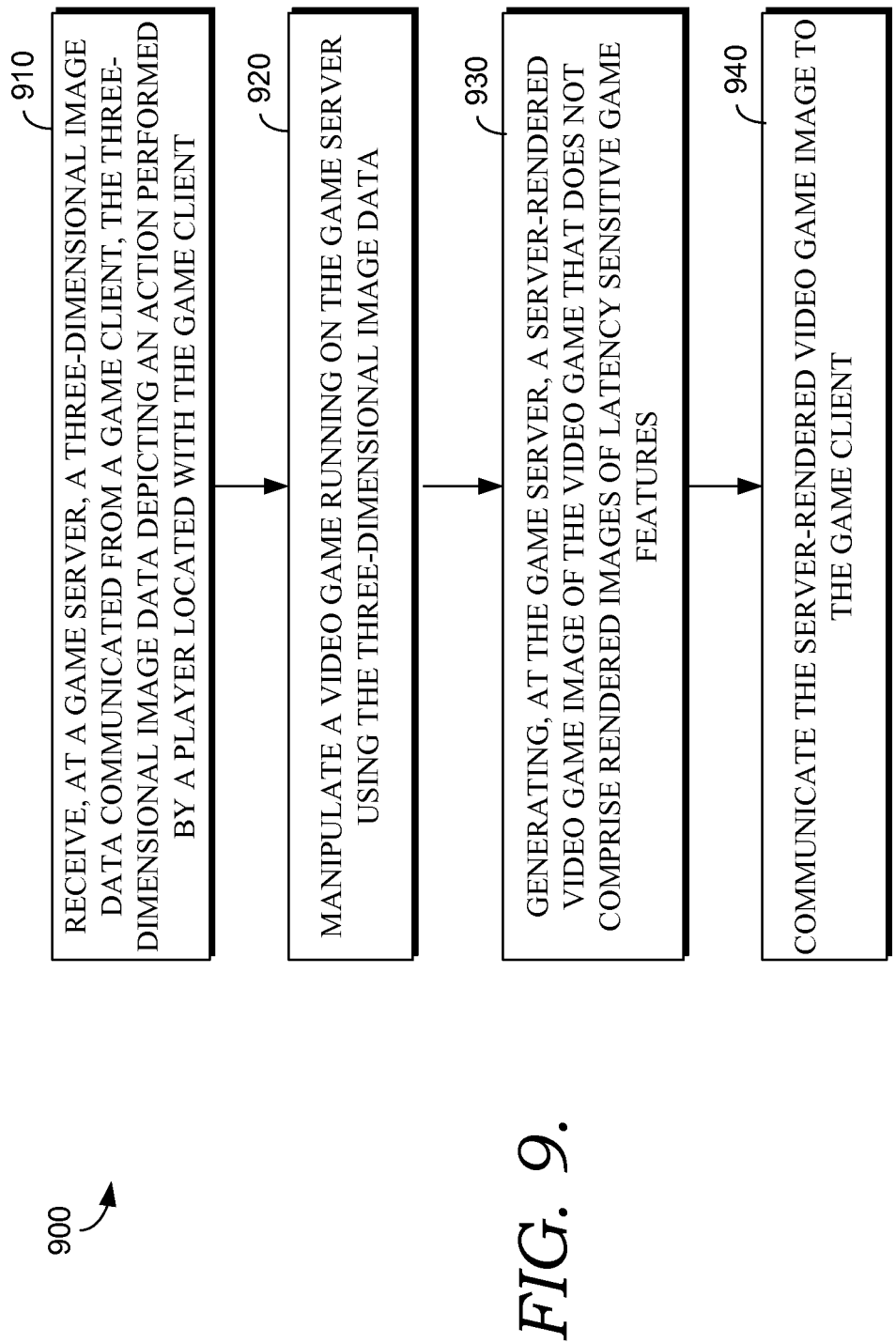
FIG. 9 is a flow chart showing a method of enabling game play over a remote connection using a data rich input device, in accordance with an embodiment of the present invention.

Turning now to FIG. 9, a method 900 for playing a video game using three-dimensional image data as a control input is shown, in accordance with an embodiment of the present invention. Method 900 may be executed in a remote gaming environment similar to the one described previously with reference to FIG. 3.

At step 910, three-dimensional image data depicting an action performed by a player is received at a game server. The three-dimensional image data depicts an action performed by a player located with the game client. The input device may integrated into the game client, such as a camera or microphone integrated into a slate or personal computer. The input device may be located nearby and communicatively coupled to the game client via a wired or wireless connection. "Received" by the game client does not need to mean the input is received from an external device. Received by the game client could mean generated by the game client and received by a component on the game client, such as signal component 622 or client rendering component 624, described previously, or a combination of components within a game execution environment that handles game function on the game client.

At step 920, game state information is updated based on an interpretation of the three-dimensional image data. At step 930, part of the three-dimensional image data is processed at the game server to generate a server-rendered video game image. The server-rendered video game image is not a complete image of the video game. One or more game features are rendered by the game client and combined with the server-rendered video game image to generate a video game image shown to a user.

At step 940, a server rendered video game image is communicated to the game client from a game server on which the video game is running.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising:
a processor; and
computer storage memory having computer-executable instructions stored thereon which, based on execution executed by the processor, configure the processor to play a video game using three-dimensional image data as a control input in a server based gaming environment by being configured to:
receive, at a game client over a computer network, three-dimensional image data as a video game control input;
process, at the game client, the three-dimensional image data to generate a basic control input;
communicate through a network interface the basic control input from the game client over the computer network to a game server on which the video game is running;
process, at the game client, part of the three-dimensional image data to generate a client-rendered video game feature;
receive, through the network interface over the computer network at the game client, a server-rendered video game image from the game server on which the video game is running, the server-rendered video game image being generated in response to a change in game state caused by the basic control input;
composite the client-rendered video game feature with the server-rendered video game image to form a rendered composite video; and
output the rendered composite video to a display device.

2. The system of claim 1, wherein the client-rendered video game feature is a latency sensitive game feature.

3. The system of claim 2, wherein the latency sensitive game feature is one where more than 80 ms roundtrip latency causes degradation of the game experience for a player.

4. The system of claim 1, wherein the client-rendered video game feature is an avatar for a player using the game client.

5. The system of claim 1, wherein the processor is further configured to time synchronize the server-rendered video game feature with the client-rendered video game image.

6. The system of claim 1, wherein the game server does not render an avatar for a player using the game client.

7. The system of claim 1, wherein the client-rendered video game feature is generated by game code that is downloaded from the game server upon initiation of a game session.

8. A method for playing a video game using three-dimensional image data as a control input, the method comprising;
receiving, at a game client over a computer network, the three-dimensional image data as a video game control input;
processing, at the game client, part of the three-dimensional image data locally to generate a client-rendered video game feature;
receiving over the computer network, through a network interface on the game client, a server-rendered video game image from a game server on which the video game is running;
compositing the client-rendered video game feature with the server-rendered video game image to form a rendered composite video; and
outputting the rendered composite video to a display device.

9. The method of claim 8, wherein the processing is performed by game-specific code.

10. The method of claim 9, wherein the game-specific code is downloaded from the game server.

11. The method of claim 8, wherein the client-rendered video game feature is an avatar image responding to a user action detected in the three-dimensional image data.

12. The method of claim 8, wherein the client-rendered video game feature is a perspective change initiated in response to detecting a user action in the three-dimensional image data that is mapped to a perspective change instruction.

13. The method of claim 12, wherein the perspective change is a scene rotation.

14. The method of claim 8, wherein the client-rendered video game feature is a video of the player shown as a picture-in-picture in combination with game scenes.

15. A computing system comprising:
a processor; and
computer storage memory having computer-executable instructions stored thereon which, based on executed by the processor, configure the processor to play a video game using three-dimensional image data as a control input by the processor being configured to:
receive, at a game client over a computer network, the three-dimensional image data as a video game control input;
process, at the game client, part of the three-dimensional image data locally to generate a client-rendered video game feature;
receive, at the game client over the computer network, a server-rendered video game image from a game server on which the video game is running;

composite the client-rendered video game feature with the server-rendered video game image to form a rendered composite video; and output the rendered composite video to a display device.

16. The computing system of claim 15, wherein game-specific code is used to configure the processor to process part of the three-dimensional image data locally.

17. The computing system of claim 15, wherein the client-rendered video game feature is an avatar image responding to a user action detected in the three-dimensional image data.

18. The computing system of claim 15, wherein the client-rendered video game feature is a perspective change initiated in response to detecting a user action in the three-dimensional image data that is mapped to a perspective change instruction.

19. The computing system of claim 18, wherein the perspective change is a scene rotation.

20. The computing system of claim 15, wherein the client-rendered video game feature is a video of the player shown as a picture-in-picture in combination with game scenes.

\* \* \* \* \*